April 19, 1966 R. DIDCHENKO 3,247,022
THERMOELECTRIC MATERIALS
Filed Aug. 16, 1960
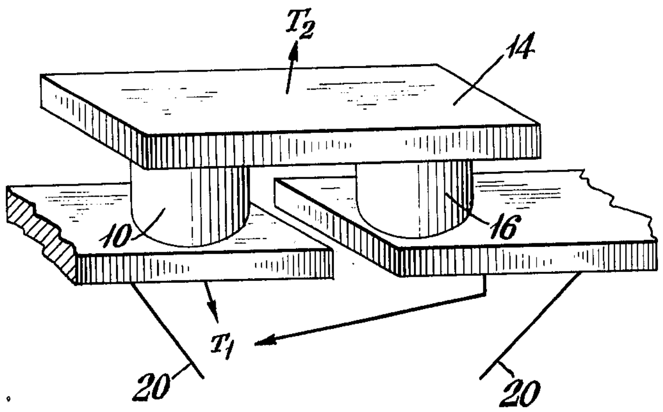
INVENTOR
ROSTISLAV DIDCHENKO
BY John F. Hohmann
ATTORNEY United States Patent Office 3,247,022

Patented Apr. 19, 1966

3,247,022
THERMOELECTRIC MATERIALS

Rostislav Didchenko, Cleveland, Ohio, assignor to Union Carbide Corporation, a corporation of New York Filed Aug. 16, 1960, Ser. No. 49,927
3 Claims. (Cl. 136—4)

This invention relates to a new group of thermoelectric compounds. Such compounds are called "thermoelectric" because they have the ability to transform heat into electricity.

Many thermoelectric materials are known and presently in used. Best known among these are lead selenide, lead telluride, bismuth selenide, bismuth telluride and alloys such as "Chromel," "Alumel" and "constantan." Undesirably, the efficiency of presently known thermoelectric compounds decreases too much at high temperatures to permit efficient operation over a wide temperature range. In useful devices, a pair of thermoelectric materials is generally required. Thus, a thermocouple or thermogenerator and a heat pump both use two thermally active elements composed of materials having different thermoelectric powers.

The main object of the present invention is to provide new and useful thermoelectric compositions having a high figure of merit as well as a wide range of thermal utility.

The thermoelectric devices utilizing the materials of the present invention consist of a suitable conductor such as boronated graphite, "Monel" or any other conductor together with a semiconductive monosulfide selected from the group consisting of the monosulfides of samarium, europium, ytterbium and uranium, their mixtures with each other and their mixtures with other lanthanide or actinide monosulfides. In the preferred embodiment of the invention, the conductor is a metallic monosulfide of lanthanide or actinide series of elements including lanthanium, cerium, praesodymium, neodymium, promethium, gadolinium, terbium, dysprosium, holmium, erbium, thulium, and thorium. Since all monosulfides of this series of elements have substantially the same coefficient of thermal expansion, less thermal shock is experienced where the conductor is also an actinide or lanthanide monosulfide.

The single figure accompanying the present description is a perspective schematic view of a thermoelectric device according to the invention.

For the purposes of this invention, the monosulfides used herein may be prepared by any suitable method. One such method consists in reaching the given lanthanon or actinide metal with the stoichiometric amount of sulfur in a thick-walled quartz tube at 1000° C. A recommended method for preparing these monosulfides comprises electrolyzing in a substantially oxygen-free atmosphere, a substantially oxygen-free higher lanthanide or actinide metal sulfide with an alkali metal halide.

The following Table I summarizes some of the pertinent room temperature values of representative materials in accord with the invention:

*Table I*

| No. | Composition | Thermoelectric Power S(mv./° C.) | Elec. Conductivity (ohm$^{-1}$ cm.$^{-1}$) | | Thermal Conductivity (watts/cm. ° C.) | Band Gap $E_0$ (volts) |
|---|---|---|---|---|---|---|
| | | | 25° C. | 100° C. | | |
| 1 | US | +50 | ---------- | ---------- | ---------- | ---------- |
| 2 | SmS | −235 | 33 | 250 | $5.6\times10^{-3}$ | 0.21 |
| 3 | YbS | +220 | 0.03 | 5 | $7.6\times10^{-3}$ | 0.35 |
| 4 | SmS·YbS | −442 | 0.7 | 30 | ---------- | 0.26 |
| 5 | 2 SmS·YbS | −330 | ---------- | ---------- | ---------- | ---------- |
| 6 | 4 SmS·4 YbS·GdS | −230 | 5 | 82 | $3.0\times10^{-3}$ | ---------- |
| 7 | 10 SmS·10 YbS·GdS | −325 | ---------- | ---------- | ---------- | ---------- |
| 8 | 3 EuS·CeS | −69 | ---------- | ---------- | ---------- | ---------- |
| 9 | 2 EuS·CeS | −37 | ---------- | ---------- | ---------- | ---------- |
| 10 | 4 YbS·GdS | −160 | 19 | 60 | ---------- | 0.24 |

Materials for thermoelectric conversion should be stable at high temperatures and have a high figure of merit as possible. Efficiency of conversion of heat to electricity depends on two factors. One of these, the Carnot efficiency, is $$\frac{T_1-T_2}{T_1}$$

where $T_1$ is the temperature in degrees Kelvin of the hot junction and $T_2$ is the temperature of the cooler junction. Thus maximum Carnot efficiencies for bismuth telluride converters operating between 373° K. and 273° K. are approximately $$\frac{373-273}{373}$$

or 26.8 percent, whereas maximum Carnot efficiencies for the lanthanide monosulfides operating between 2273° K. and 273° K. are approximately $$\frac{2273-273}{2273}$$

or 88 percent. The other factor called thermoelectric efficiency, which includes the figure of merit, reduces this value considerably. The figure of merit $$Z=\frac{S^2\sigma}{\kappa}$$

where S is the Seebeck coefficient (a measure of the thermoelectric power generated between two ends of a specimen per degree centigrade temperature difference therebetween), and $\sigma$ and $\kappa$ are electrical and thermal conductives, respectively. The figure of merit of $Bi_2Te_3$ is approximately $1.5\times10^{-3}$. From the values in Table I, the present monosulfides may be shown to have figures-of-merit approaching that of $Bi_2Te_3$.

It is noteworthy to observe that the properties of the various compositions are synergistic and not merely additive, as can be seen by comparing compositions 2, 3, 4 and 5.

The normally tripositive lanthanides form monosulfides having a golden metallic luster. These have high electrical and thermal conductivity, and low thermoelectric power. However, the monosulfides of samarium, europium and ytterbium, which contain stable dispositive ions, are semiconductors having high thermoelectric power, and low thermal conductivity. Particularly, europium monosulfide has a large band gap and is practically an insulator at room temperature. Samarium monosulfide is an n-type semiconductor and has a room temperature thermoelectric power of 235$\mu$ v./° C., electrical conductivity of 30 (ohm-cm.)$^{-1}$ and thermal conductivity of $5.6 \times 10^{-3}$ watts/cm. degree C. Ytterbium moelectric power of YbS of $25 \times 10^{-3}$ ohm$^{-1}$ cm.$^{-1}$ tivity strongly depending upon stoichiometery. The thermoelectric power of YbS of $25 \times 10^{-3}$ ohm$^{-1}$ cm.$^{-1}$ conductivity is 220$\mu$ v./° C. Uranium monosulfide is a p-type semiconductor, which has extremely high electrical conductivity of $10^5$ to $10^6$ (ohm-cm.)$^{-1}$ and a thermoelectric power of about 50 microvolts per degree centigrade.

To vary properties of the monosulfides of the invention, it has sometime been found advantageous to dope the same with about 0.1 to about 10 percent by weight of a suitable D-level electron donor or acceptor, such as silver sulfide. The same effect may be obtained by deviations of plus 10 percent to minus 10 percent in the stoichiometery of the compositions. This is achieved by providing from about .9 to about 1.1 atoms of sulfur per metallic atom in the monosulfide.

Obviously, the present invention may assume various forms. In one embodiment, a thermoelectric converter is fabricated by securing with a conductive solder a member composed of an n- or p-type monosulfide to a bar of platinum, nickel or nickel alloy. In another, the semiconductive member is secured to a conductor by means of ultrasonic welding.

Advantage can be taken of the fact that all actinide and lanthanide monosulfides can be easily machined. In such an embodiment of the invention, a nonsemiconductive monosulfide having two cavities drilled and tapped therein serves as a conductive arm for two threaded semiconductive monosulfide elements of the thermoelectric device.

In the embodiment of the invention shown in the drawing, a disc 10 consisting of semiconducting monosulfide, e.g., samarium monosulfide, and a second disc 16 of thermoelectrically different semiconducting monosulfide, e.g., ytterbium monosulfide, are positioned intermediate conductor 14 and power terminals 20. With such a configuration the thermoelectric generator is found to have a thermoelectric power in excess of 400 microvolts per degree centigrade.

The above device may be used as a generator or as a heat pump. When it is desired to have the same function as a generator, heat is applied to conductor 14 and power will be delivered at the terminals 20.

When the above-described device is intended to function as a heat pump, power is supplied to terminals 20 and the hot junction temperature $T_2$ will become greater than the cold junction temperature $T_1$. By reversing the polarity of the applied voltage, $T_2$ will become less than $T_1$.

The semiconductor mixtures described in this application are solid solutions among the monosulfides used. These can be achieved by mixing powders of the respective monosulfides and sintering them at high temperature. The resulting product has a sodium chloride lattice with a lattice constant different from that of any of the starting materials.

What is claimed is:

1. A thermoelectric device having a first number comprising a mixture of uranium monosulfide and at least one additional monosulfide of the lanthanide and other actinide elements and a second member of opposite conductivity type electrically connected to said first member.

2. The thermoelectric device of claim 1 wherein said monosulfide mixture is non-stoichiometric and contains from 0.9 to 1.1 atoms of sulfur per metallic atom in said monosulfides.

3. The thermoelectric device of claim 1 wherein said monosulfide mixture contains between about 0.1 and about 10 weight percent of a D-level doping agent.

References Cited by the Examiner

UNITED STATES PATENTS

| | | | |
|---|---|---|---|
| 2,490,826 | 12/1949 | Mochel | 252—517 |
| 2,534,676 | 12/1950 | Newton et al. | 23—14.5 |
| 2,951,105 | 8/1960 | Busanovich | 136—5 |
| 2,952,725 | 9/1960 | Evans et al. | 136—4.2 |
| 2,963,531 | 12/1960 | Seegert | 136—4.2 |
| 2,966,033 | 12/1960 | Hughel | 62—3 |
| 2,973,627 | 3/1961 | Lackey et al. | 62—3 |
| 3,009,977 | 11/1961 | Houston | 136—5 |

OTHER REFERENCES

Danko et al.: "Thermoelectric Nuclear Fuel Element Annual Progress Report," April 15, 1959. WCAP—1162, pp. 3, 4, 33, 34, and 37–42.

WINSTON A. DOUGLAS, *Primary Examiner.*

ROGER L. CAMPBELL, JOHN H. MACK, *Examiners.*